(12) United States Patent
Pilz et al.

(10) Patent No.: US 12,162,249 B2
(45) Date of Patent: Dec. 10, 2024

(54) PROCESS FOR PREPARING A LAMINATED GLAZING

(71) Applicant: Pilkington Group Limited, Lancashire (GB)

(72) Inventors: Joachim Pilz, Oer-Erkenschwick (DE); Neil John Durbin, St Helens (GB); Peter Paulus, Muenster (DE)

(73) Assignee: Pilkington Group Limited, Lancashire (GB)

( * ) Notice: Subject to any disclaimer, the term of this patent is extended or adjusted under 35 U.S.C. 154(b) by 995 days.

(21) Appl. No.: 17/262,469

(22) PCT Filed: Jul. 25, 2019

(86) PCT No.: PCT/GB2019/052090
§ 371 (c)(1),
(2) Date: Jan. 22, 2021

(87) PCT Pub. No.: WO2020/021273
PCT Pub. Date: Jan. 30, 2020

(65) Prior Publication Data
US 2021/0221103 A1    Jul. 22, 2021

(30) Foreign Application Priority Data

Jul. 25, 2018  (GB) ..................... 1812147

(51) Int. Cl.
*C03B 23/025*    (2006.01)
*B32B 17/10*    (2006.01)
(Continued)

(52) U.S. Cl.
CPC .. *B32B 17/10844* (2013.01); *B32B 17/10036* (2013.01); *B32B 17/10137* (2013.01);
(Continued)

(58) Field of Classification Search
CPC ........................ C03B 23/0252; C03B 23/0302
See application file for complete search history.

(56) References Cited

U.S. PATENT DOCUMENTS 3,904,460 A    9/1975 Comperatore
4,260,408 A    4/1981 Reese et al.
(Continued)

FOREIGN PATENT DOCUMENTS

EP    0398759 A2    11/1990
EP    0677486 A2    10/1995
(Continued)

OTHER PUBLICATIONS

International Search Report and Written Opinion issued by the International Searching Authority on Oct. 4, 2019 in corresponding International Patent Application No. PCT/GB2019/052090, 12 pages.
(Continued)

*Primary Examiner* — Cynthia Szewczyk
(74) *Attorney, Agent, or Firm* — BUCHANAN INGERSOLL & ROONEY PC (57) ABSTRACT

A process for preparing a laminated glazing involves providing a first glass sheet having a desired shape with a first thickness, providing a second glass sheet having a desired shape with a second thickness; providing an interlayer between the first and second glass sheet; applying a mould shaped substantially the same as the first glass sheet against the second glass sheet; aligning the two glass sheets and misaligning the mould with respect to the two glass sheets so the mould is offset relative to the two glass sheets; and laminating together the first and second glass sheets and the interlayer at a temperature and pressure sufficient to adhere the interlayer to the glass sheets, such that after lamination, the second glass sheet is offset relative to the first glass sheet
(Continued)

whilst the shape of the second glass sheet is substantially the same as the shape of the first glass sheet.

17 Claims, 4 Drawing Sheets

(51) Int. Cl.
    *C03B 23/03*     (2006.01)
    *C03C 27/10*     (2006.01)

(52) U.S. Cl.
    CPC .. *B32B 17/10348* (2013.01); *B32B 17/10761* (2013.01); *B32B 17/10889* (2013.01); *C03B 23/0252* (2013.01); *C03B 23/0302* (2013.01); *C03C 27/10* (2013.01)

(56) References Cited

U.S. PATENT DOCUMENTS

| | | | |
|---|---|---|---|
| 4,501,546 | A | 2/1985 | Valimont et al. |
| 4,753,669 | A | 6/1988 | Reese |
| 2004/0231778 | A1 | 11/2004 | Teschner et al. |
| 2014/0141206 | A1 | 5/2014 | Gillard et al. |
| 2015/0122406 | A1 | 5/2015 | Fisher et al. |
| 2017/0021597 | A1 | 1/2017 | Michetti et al. |
| 2017/0291842 | A1 | 10/2017 | Paulus et al. |

FOREIGN PATENT DOCUMENTS

| | | | | |
|---|---|---|---|---|
| FR | 2594812 | A1 * | 8/1987 | |
| GB | 1500099 | A | 2/1978 | |
| GB | 2221424 | A | 2/1990 | |
| NZ | 612551 | A * | 8/2014 | ....... B32B 17/10036 |
| WO | 2004083835 | A1 | 9/2004 | |
| WO | 2004085324 | A1 | 10/2004 | |
| WO | 2005033026 | A1 | 4/2005 | |
| WO | 2012073030 | A1 | 6/2012 | |
| WO | 2013184904 | A1 | 12/2013 | |
| WO | 2015031594 | A2 | 3/2015 | |
| WO | 2015092385 | A1 | 6/2015 | |
| WO | 2015191527 | A2 | 12/2015 | |
| WO | 2016030678 | A1 | 3/2016 | |
| WO | 2018095693 | A1 | 5/2018 | |

OTHER PUBLICATIONS

Search Report issued by the UK Intellectual Property Office on Dec. 5, 2018 in corresponding British Patent Application No. GB1812147. 5, 4 pages.

Beeck, M.A., et al., "Optical Properties of Automotive Glazing—Design and Feasibility Limitations?," Glass Processing Days 2003, Volkswagen AG, Research and Development, pp. 502-504, 2003 (month unknown).

* cited by examiner

PROCESS FOR PREPARING A LAMINATED GLAZING

The present invention relates to a process for preparing a laminated glazing, a laminated glazing and to the use of same in a vehicle. More specifically, the present invention relates to a process for preparing a light weight laminated glazing and to the use of same in a vehicle, especially as a windscreen or backlight for a vehicle.

It is known that a laminated glazing for a vehicle windscreen usually comprises two shaped sheets of glass joined by at least one adhesive layer, such as polyvinyl butyral (PVB). It is conventional in the art to refer to each glass sheet as a "ply". Often the adhesive layer itself is also referred to as a "ply", that is, a ply of PVB. The glass sheet configured to face the interior of a vehicle in which the laminated glazing is installed is usually referred to as the "inner ply" whilst the glass sheet configured to face the exterior of the vehicle in which the laminated glazing is installed is often referred to as the "outer ply". The two sheets of glass are often comprised of the same material such as soda-lime silicate glass.

Each of the glass sheets used in a laminated glazing for a vehicle is usually shaped or bent in one or two mutually perpendicular directions such that the laminated glazing is curved. Many methods are known for bending sheets of initially flat glass to a desired curvature to form a vehicle glazing such as a windscreen.

For example, one known method is to bend a pair of initially flat glass sheets at the same time, with one sheet of glass on top of another and separated by a suitable "parting powder" such as calcium carbonate. In this way, the inner ply and outer glass ply sheets are heated until malleable, bent and hence shaped at the same time by for instance a gravity sag bending process.

An alternative method of bending glass sheets for a vehicle glazing such as a windscreen is to heat and bend the inner ply and the outer ply at different times, usually one after the other, thereby forming the inner ply and the outer ply individually. For example, one such method of bending flat glass sheets individually involves conveying heated flat glass sheets between a pair of complementary shaping members and press bending each glass sheet separately. The glass sheets may then be cooled, brought together and laminated using a suitable adhesive interlayer such as PVB.

For example, EP 0398759 describes how first and second glass sheets combined together into a single laminated glass sheet, are heated in a heating furnace so that the temperature of the first glass sheet and the second glass sheet at the exit of the heating furnace are substantially equal.

WO 2004/085324 A1 describes how glass sheets of an asymmetric glass-sheet pair, intended for the production of laminated glass, are preheated in a preheating furnace and then undergo a press-bending process in a press-bending station. By means of a temperature measuring point arranged at the exit of the press-bending station, it is ensured that the glass sheets exhibit a uniform bending behaviour, in order to guarantee identical restoring forces during cooling.

In U.S. Pat. No. 4,260,408 there is described how glass sheets are shaped by a bending method in which glass is first shaped to a longitudinal component of bend, by gravity sagging onto an outline mould followed by press bending against a solid lower shaping mould to complete the bend, which includes a complicated transverse component of bend. A particular speed cycle is provided to lift and lower the lower shaping mould to minimize the duration of the shaping cycle and to minimize the chance of misaligning the glass relative to the outline mould during transfer of the glass from the outline mould to the lower shaping mould and its return to the outline mould.

In GB 2221424 there is described a method for increasing resistance to penetration through a glazed opening, characterized in that the glass is removed from the glazed opening and replaced by laminated glazing consisting of the removed glass, or a pane of substantially identical geometry, to which is fastened, by cementing with the aid of at least one intermediate layer of thermoplastics material, a sheet of thinner glass cut out to have dimensions substantially equal to those of the original glass pane, and which has been subjected to a chemical tempering treatment.

There have been numerous advances in laminated glazing technology, especially for automotive applications, however, optical distortion is often not considered.

For example, in WO 2015/092385 there is described a laminated glazing comprising a first ply of glazing material and a second ply of glazing material joined by at least one ply of adhesive interlayer material. The first ply of glazing material comprises a sheet of glass having a first composition and the second ply of glazing material comprises a sheet of glass having a second composition different to the first composition. The laminated glazing has a peripheral region extending around the periphery of the laminated glazing and a surface compression stress in the peripheral region. Also present is an edge compression, wherein the magnitude of edge compression is greater than the magnitude of the surface compression stress in the peripheral region. Whilst this document teaches how to achieve a light weight windscreen, the optical parameters required for light weight windscreens are not considered.

In WO 2015/031594 there is disclosed a laminate structure having a first glass layer, a second glass layer, and at least one polymer interlayer between the first and second glass layers. In some embodiments, the first glass layer may be comprised of a strengthened glass having first and second surfaces, the second surface being adjacent the interlayer and chemically polished, and the second glass layer may be comprised of a strengthened glass having third and fourth surfaces. The fourth surface is opposite the interlayer and chemically polished and the third surface is adjacent the interlayer and has a substantially transparent coating formed thereon. In another embodiment, the first glass layer is curved, and the second glass layer is substantially planar and cold formed onto the first glass layer to provide a difference in surface compressive stresses on the surfaces of the second glass layer. However, the optical properties for the laminate structure described in this document and prepared using standard lamination procedures are not optimal for lighter weight laminated glazings.

It is known that to achieve good transmission optics, that is, low optical power, in a laminated glazing such as a windscreen comprising two glass sheets and an interlayer, that the surfaces of the two glass sheets each facing away from the interlayer (often referred to as surfaces 1 and 4) should have as close to identical curvature as possible.

In addition, it is known from "Glass Processing Days, 2003, pages 502-504 that the angle of installation of a vehicle windscreen has an effect on the optical properties. For example, the amplification of optical power varies with installation angle. Therefore, as the angle of installation increases, a much better optical quality is required because any faults present in the windscreen are amplified to a higher degree. One way of overcoming such an issue is to improve the optical quality of the glass used to make the laminated windscreen, however, it is not always possible to produce glass of an improved optical quality at an acceptable commercial cost and yield.

Another way of addressing this issue and of making a laminated glazing having reduced optical distortion when installed in a vehicle is described in WO 2016/030678. In this patent application the laminated glazing has first and second sheets of glazing material each separately shaped between a pair of shaping members that are then laminated together. During the lamination step, the first sheet of glazing material may be displaced relative to the second sheet of glazing material by a lateral and/or longitudinal positional displacement. The first and/or second sheet of glazing material may have been cut such that after lamination at least a portion of the peripheral edges thereof are aligned. However, in WO 2016/030678, the optical distortion for windscreens installed in vehicles is improved to some extent by each sheet of glass being produced by the same process and therefore of substantially identical shape and curvature before lamination.

As well as optical requirements, there is an ever increasing need for laminated glazings in the automotive industry to be of a reduced final weight.

One way of achieving such light-weight glazing units is to use glass sheets which are asymmetric. That is, the individual sheets of glass making up the windscreen differ in one or more characteristics such as thickness. For example, in WO 2012/073030 there is described a laminated glazing comprising a first ply of glass having a thickness in a range 1.9 to 2.4 mm, a polymer interlayer, and a second much thinner ply of glass having a thickness in the range 0.8 to 1.4 mm, thereby reducing the overall weight of the laminated glazing. However, the main aim of the invention in WO 2012/073030 is to reduce the overall weight of the laminated glazing, not optical considerations.

It is possible to produce glass sheets for use in lightweight glazing units using for example, gravity bending processes and thereby produce asymmetric sheets separately for use in light-weight glazing units. However, it is currently not possible to shape thin glass plies using gravity bending processes and to prepare light-weight glazing units by this process to the same level of optical quality.

Laminated glazing units exist which seek to improve optical performance by addressing imperfections which arise during manufacture and particularly during shaping. That is, the imperfections which arise during shaping of glass sheets by press-bending when a surface of the glass sheet contacts a shaping member and produces an imprint on the surface of the shaped press-bent glass sheet that has been in contact with the shaping member.

For example, in U.S. Pat. No. 4,753,669, were press bending shaping members are covered with a knitted fibre or knitted wire mesh, woven wire screens are used in combination with fibre glass covers to increase the useful lifespan of the screens. However, such wire screens are prone to wrinkling when stretched across or pressed against compound and/or complex surfaces. The wrinkles lead to irregularities in the pressing surface which may then be transferred to the pressed glass sheets, causing optical distortion. U.S. Pat. No. 4,753,669 addresses this problem by providing a knitted wire mesh superimposed over an insulating material layer. The knitted wire mesh is said to provide a smooth pressing surface.

Likewise, in WO2005/033026A1 a press bending station is described that includes an annular mould and a full-face mould. Holes, selectively connected to a negative pressure source, are placed in portions of the full face mould that are determined by the configuration of the annular mould when the annular mould comes into contact with a heated glass sheet during the press bending process. The heated glass sheet is drawn by negative pressure through the holes towards the full-face mould and thus acquires its shape. The full-face mould may be covered by at least one fine mesh cloth, that is, a woven stainless steel.

However, the stainless steel woven cloth covers of the type described in U.S. Pat. No. 4,753,669 still lead to slight deformations in the glass surface, resulting in an increased optical distortion in transmission when looking through the glass, in particular when the glass is inclined at an angle to the direction of vision, as is typical when the laminated glazing is installed in a vehicle as a front windscreen.

WO 2016/030678 seeks to address the problem of optical distortions in laminated glazed by compensating for imperfections which arise, and which are invisible to the naked eye, but which are magnified once glass sheets produced using automated shaped processes are used to prepare a laminated windscreen. However, WO 2016/030678 does not address how to compensate for imperfections which arise, and which are magnified when two glass sheets prepared by different shaping processes are used to prepare a laminated windscreen.

Consequently, in addition to the need for a process by which asymmetric and light weight laminated glazings such as windscreens, backlights or sidelights may be produced with inner and outer glass plies prepared using different shaping processes or tooling, and in which the glass plies have been produced at different times using different processes, there is also a need for such laminated glazings which offer a reduced optical distortion when installed in a vehicle.

Further, as the optical quality requirements for laminated glazing, especially in automotive applications becomes ever more stringent, slight deformations on the surface of the glass that result in an increased optical distortion in transmission, (when looking through glass inclined at an angle to the direction of vision) as is typical when the laminated glazing is installed in a vehicle as a front windscreen, have become increasingly unacceptable, with attempts made to combat same.

Therefore, there exists the need for a process by which asymmetric and light weight laminated glazings may be produced with inner and outer glass plies prepared using different shaping processes or tooling, or in which the glass plies have been produced at different times, and which are used to form automotive glazing, specifically a windscreen.

That is, there is a need for a process of making a laminated glazing unit such as a vehicle windscreen, backlight or sidelight, using asymmetrical glass plies which has reduced optical distortion when installed in a vehicle, and/or wherein the inner area of the glazing such as a windscreen, especially demonstrates improved transmission optics.

According to a first aspect of the present invention there is provided a process for preparing a laminated glazing suitable for use in a vehicle comprising the steps of:
  i) providing a first glass sheet formed into a desired shape with a first thickness by a first procedure;
  ii) providing a second glass sheet formed into a desired shape with a second thickness by a second procedure;
  iii) providing an interlayer located between the first and second glass sheet;
  iv) providing a mould which is shaped substantially the same as the first glass sheet and applying the mould against the second glass sheet; and
  v) aligning the first and second glass sheets; and vi) misaligning the mould with respect to the second and first glass sheets such that the mould is offset relative to the first and second glass sheets; and vi) laminating together the first and second glass sheets and the interlayer at a temperature and pressure sufficient to adhere the interlayer material to the glass sheets, such that after lamination, the second glass sheet is offset with respect to the first glass sheet whilst the shape of the second glass sheet is substantially the same as the shape of the first glass sheet, to thereby compensate for distortions in the laminated glazing when the laminated glazing is installed in the vehicle.

Preferably, in relation to the first aspect of the present invention the mould is aligned with a vertical offset with respect to the first and second glass sheets.

In addition, in the process according to the present invention the mould, and/or second glass sheet and/or first glass sheet are preferably offset by positioning means which hold the mould in a required offset position relative to the second glass sheet and first glass sheet prior to and during lamination of the glass sheets.

Consequently, in one embodiment of the process of the present invention, preferably i) the first glass sheet comprises at least one first positioning means; and/or ii) the second glass sheet comprises at least one second positioning means; and/or iii) the mould comprises at least one third positioning means, and wherein iv) the first and second glass sheets and the mould are aligned by means of the at least one first and/or second and/or third positioning means respectively prior to and during lamination.

In alternative second and third embodiments of the process of the present invention the positioning means preferably comprises a profiled vacuum ring, or the positioning means comprises one or more clamps and/or stoppers respectively.

In relation to the first embodiment of the process of the present invention, the use of positioning means preferably on at least the first glass sheet and the mould, and even more preferably on each of the first and second glass sheets and the mould, enable the first glass sheet and the mould and more preferably the first and second glass sheets and the mould to be aligned prior to lamination in a certain position relative to the first and second glass sheets to allow compensation for distortions in the laminated glazing when the laminated glazing is installed at an angle in the vehicle.

The first, second and third positioning means may each comprise a single dot or mark or a series of dots and marks on each side of the first and/or second glass sheet and/or mould to enable the first and second glass sheets and the mould to be aligned and offset to the required extent and at the required angle prior to lamination such that once laminated and installed in a vehicle the laminated glazing compensate for distortions.

The alignment and/or offsetting of the first and second glass sheets and the mould to the required extent and at the required angle prior to lamination enables compensation for distortions to be achieved which preferably amount to at least a 10% improvement compared with traditional laminations not produced by the method of the present invention.

Preferably in relation to the process of the present invention in step vi) the first and second glass sheets and the interlayer are laminated together at a temperature in the range of 90° C. to 132° C., and a pressure in the range 8 to 16 bar, to adhere the interlayer material to the two glass sheets.

In accordance with the present invention the thickness of the first glass sheet may be different to the thickness of the second glass sheet. Alternatively, the thickness of the first glass sheet may be the same as the thickness of the second glass sheet. However, the process of the present invention is preferably applied when laminating glass sheets of different thickness, that is, preferably when the thickness of the first glass sheet is different to the thickness of the second glass sheet.

In regard to the present invention, the inventors have found that lamination of the first and second glass sheets preferably occurs at a temperature in the range of 90° C. to 132° C. and a pressure in the range 8 to 16 bar. Alternatively, lamination of the first and second glass sheets preferably occurs at a temperature in the range of 95° C. to 130° C. and a pressure in the range 8 to 16 bar. More preferably, lamination of the first and second glass sheets occurs at a temperature in the range 100° C. to 130° C. Even more preferably lamination of the first and second glass sheets occurs at a temperature in the range of 100° C. to 125° C. or 100° C. to 120° C. or 95° C. to 110° C. Most preferably however, lamination of the first and second glass sheets occurs at a temperature in the range of 100° C. to 110° C. All of the above temperature ranges may be preferably used in conjunction with a pressure in the range of 8 to 16 bar.

The lamination step vi) may be conducted using a vacuum bag and/or ring in an autoclave. Lamination step vi) may preferably then be performed at a temperature in the region of 95° C. to 110° C.

It will be appreciated that a range of suitable interlayer materials may be used, however preferably the interlayer comprises polyvinylbutyral (PVB).

In relation to the first aspect of the present invention, the first glass sheet is preferably press-bend into the desired shape. That is, for the process according to the first aspect of the present invention, the first procedure used to form the first glass sheet into the desired shape comprises press-bending. Also, in relation to the process according to the first aspect of the present invention, the second procedure used to form the second glass sheet into the desired shape comprises gravity sag-bending.

The thickness of the second glass sheet is preferably in the range 0.2 mm to 1.4 mm. More preferably, the thickness of the second glass sheet is in the range 0.5 mm to 1.0 mm or 0.5 to 0.95 mm. The thickness of the second glass sheet may also be in the range 0.5 to 1.2 mm.

The thickness of the first glass sheet is preferably in the range 1.4 mm to 2.5 mm. More preferably, the thickness of the first glass sheet is in the range 1.6 mm to 2.3 mm. The thickness of the first glass sheet may also be in the range 1.6 mm to 2.1 mm.

According to the first embodiment of the first aspect of the present invention the process preferably further comprises the step of:

iv) providing a mould against the second glass sheet during lamination wherein the mould is shaped substantially the same as the first glass sheet.

The mould may be comprised of glass, ceramic or metal. However, most preferably the mould is comprised of glass. That is, in a preferred embodiment of the process of the present invention the mould preferably comprises a third glass sheet which is substantially the same shape as the first glass sheet.

Preferably, the third glass sheet is formed into the desired shape by press bending prior to use in the lamination of the first and second glass sheets.

The thickness of the third glass sheet is preferably in the range 1.4 mm to 2.5 mm. More preferably, the thickness of the third glass sheet is in the range 1.6 mm to 2.3 mm. The thickness of the third glass sheet may also be in the range 1.6 mm to 2.1 mm.

In addition, it is preferred that the first and third glass sheets are preferably prepared in a single press-bending batch process. Consequently, the first and third glass sheets will be substantially the same thickness.

The process according to the first embodiment of the first aspect of the present invention preferably further comprises the step of:

vii) providing a foil layer between the second glass sheet and the mould shaped substantially the same as the first glass sheet.

That is, the first embodiment of the first aspect of the present invention preferably further comprises the step of: vii) providing a foil layer between the second glass sheet and the third glass sheet, said third glass sheet being shaped substantially the same as the first glass sheet.

The foil layer preferably comprises a thickness of between 0.05 mm and 0.2 mm. In addition, the foil layer preferably comprises a non-stick film. Suitable non-stick films ensure that the foil layer, the second glass sheet and the third glass sheet readily separate after the lamination process. A preferred non-stick foil layer film material comprises polyester.

Therefore, also in relation to the first aspect of the present invention, after lamination is complete, the third glass sheet and the foil layer are removed from the laminated first and second glass sheets. Even more preferably, post lamination the foil layer and the mould shaped substantially the same as the first glass sheet (preferably in the form of a third glass sheet), are removed from the laminated first and second glass sheets in a single step.

It is preferred therefore that in accordance with the first aspect of the present invention there is provided a laminated glazing in which:

the first glass sheet comprises a first glass outer-face and a first glass sheet inner face; and the second glass sheet comprises a second glass sheet outer-face and a second glass sheet inner face; and wherein the first glass sheet inner face and the second glass sheet inner face are located closest to the interlayer; and wherein for a given point on the laminated glazing, the difference between the curvature of the first glass sheet and the curvature of the second glass sheet at the given point on the laminated glazing produced by the process of the first aspect of the present invention, is of a significantly low value that an acceptably low value for optical power in transmission is provided. That is, low levels of distortion are seen by the driver of a vehicle into which the laminated glazing is installed.

That is, it is preferred that, a laminated glazing prepared according to the process of the first aspect of the invention demonstrates optical power in transmission values which are no higher than 130% of the value recorded for a laminated glazing prepared by laminating two identical glass sheets.

In such case, the optical power in transmission of the laminated glazing is measured by devices described according to agreement ECE R43 standard, or by devices prepared by the company ISRA Vision AG, or in accordance with the appropriate VDA Recommendation, such as VDA 312 Recommendation (March 2015) which relates to 'The requirements to test facilities for inspection of the visual distortion at vehicle panes in transmission'.

It is further preferred that the mould is aligned with a vertical offset with respect to the first and second glass sheets.

According to a second aspect of the present invention there is provided a laminated glazing suitable for use in a vehicle and prepared according to any of the features described above in relation to the first aspect of the present invention, said features being present either alone or in combination.

Also according to the second aspect of the present invention there is provided a laminated glazing suitable for use in a vehicle and prepared according to any of the features described above in relation to the first embodiment of the aspect of the present invention wherein said glazing comprises an improvement in optical power of at least 10% compared with a laminated glazing prepared by a laminating method which does not apply a mould which is shaped substantially the same as the first glass sheet, against the second glass sheet during laminating.

According to a third aspect of the present invention there is provided the use of a laminated glazing prepared in accordance with any combination of the features of the first or second aspect of present invention, installed in a vehicle.

In accordance with the first, second or third aspects of the present invention the laminated glazing may be any glass article used in a vehicle. However, it is preferred that the laminated glazing according to the first, second or third aspects of the present invention is a vehicle windscreen or vehicle rear window (backlight) or sidelight.

Embodiments of the present invention will now be described by way of example only with reference to the following examples and accompanying drawings (not to scale), in which:

FIGS. 2(*a*), 2(*b*), 2(*c*) and 2(*d*) are schematic representations of a first embodiment of a method of preparing a laminated windscreen according to a first aspect of the present invention.

In relation to the present invention, the inventors have found that when preparing a laminated glazing such as a vehicle windscreen with two curved glass sheets or plies, in which one of the glass sheets is of a reduced thickness compared with the thickness of the second glass sheet, and in which the glass sheets have been formed into a curved structure using different techniques, the thinner glass sheet may be successfully moulded to the curvature and shape of the thicker and more rigid glass sheet using a modified glass processing technique as will be described further herein.

In addition, the inventors have found that by offsetting the alignment of the first and second glass sheets with respect to a mould or slave glass prior to laminating, the optical properties of a laminated glazing according to the present invention when installed in a vehicle, may be improved further depending upon the extent of alignment and offsetting of the first and second glass sheets relative to the mould.

The inventors have also found that harmonisation of the curved shape of the two glass sheets in a laminated glazing such as a windscreen may be achieved using a procedure described according to the process of the present invention. The methods according to the present invention are described further below by way of example in relation to and as illustrated in FIGS. 2(a), 2(b), 2(c) and 2(d).

The laminated glazing prepared by the method described below may be preferably curved in two directions, with each direction of curvature orthogonal to the other. The radius of curvature in one or both directions may be preferably between 300 mm and 8000 mm.

Figure 1A:
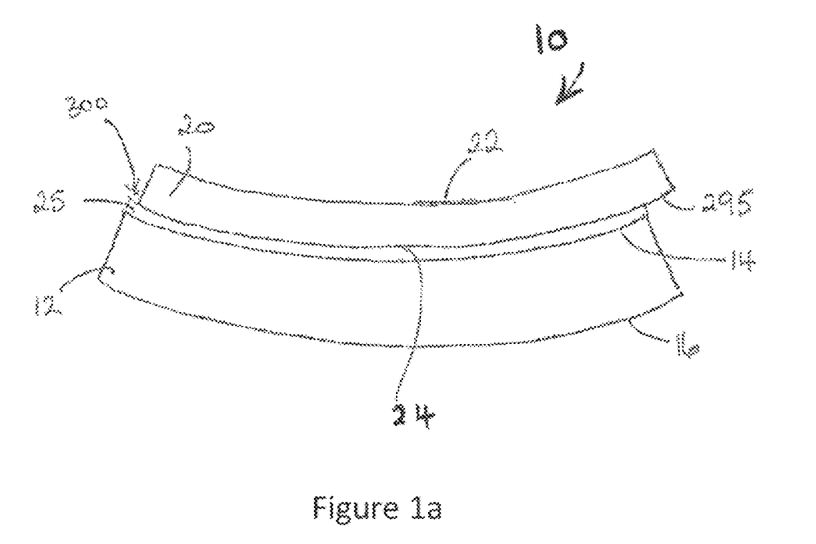
FIG. 1*a* is a simplified cross-sectional view of a laminated glazing prepared in accordance with the present invention.
Figure 1B:
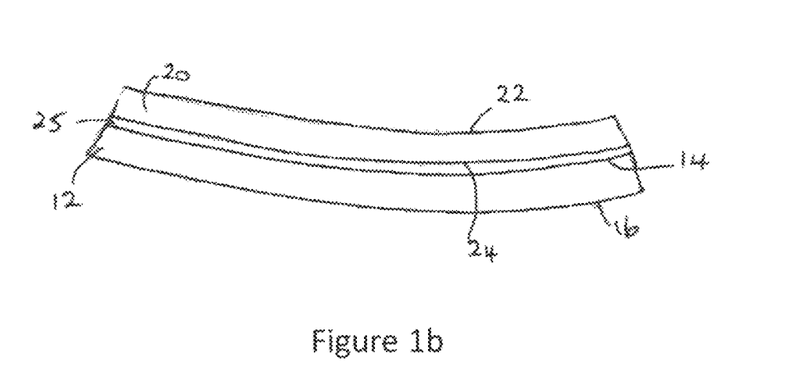
FIG. 1*b* is a simplified cross-sectional view of a preferred embodiment of a laminated glazing prepared in accordance with the present invention.

FIGS. 1a and 1b illustrate two embodiments of a laminated glazing 10 prepared in accordance with the method of the present invention, preferably there is provided a first ply (or glass sheet) 12 having a concave surface 14 and an opposing convex surface 16. There is also provided a second ply (or glass sheet) 20 having a convex surface 24 and an opposing concave surface 22. The concave surface 14 of the first ply 12 is in contact with an interlayer 25 and the convex surface 24 of the second ply 20 is in contact also with the interlayer 25. In this way, the interlayer is located between the first and second glass sheets.

Using conventional nomenclature, the convex surface 16 of the first ply 12 is referred to as "surface one" (or S1) of the laminated glazing 10. The concave surface 14 of first ply 12 is referred to as "surface two" (or S2) of the laminated glazing 10. The convex surface 24 of the second ply 20 is referred to as "surface three" (or S3) of the laminated glazing 1, and the concave surface 22 of the second ply 20 is referred to as "surface four" (or S4) of the laminated glazing 10.

In relation to the present invention the laminated glazing 10 may be a vehicle glazing such as a vehicle windscreen, a vehicle sunroof, a vehicle sidelight (side window) or a vehicle back light (back window). The laminated glazing 10 may be also a glazing for a building. However, the inventors have found that the method is particularly suited for preparing vehicle windscreens or backlights, especially windscreens.

Method 1.

In FIGS. 2(a), 2(b), 2(c) and 2(d) a2 there are illustrated a schematic representation 200 of a method of preparing a laminated glazing such as for example a vehicle windscreen, backlight, roof-light or sidelight according to a first aspect of the present invention.

Figure 2A:
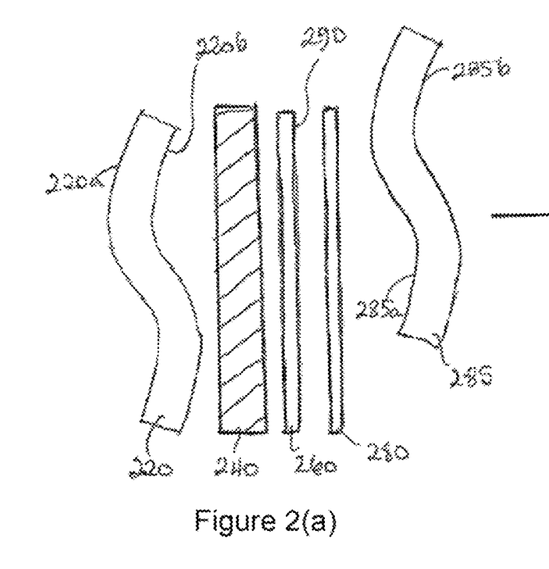

In the method, a first glass sheet 220 (which may be flat) such as soda lime silicate glass, is formed into the desired shape, (such as, for example the shape required for a windscreen) by for example press-bending. This may be achieved by taking a flat sheet of glass, such as soda lime silicate glass, and cutting the sheet of glass into a shape with the required edge profile. The glass sheet is then heated to a malleable state and moulded generally by for example, press-bending.

In press-bending, the process typically uses a pair of complementary shaping moulds; an upper shaping mould and a lower complementary shaping mould. Press-bending commonly involves the use of at least one heated shaping mould. The press-bending process is used to form the glass sheet into the shape of for example the required windscreen with a radius of curvature in one or more directions of between 300 mm and 8000 mm.

Next, in the method of preparing a laminated glazing according to the present invention, a second thinner flat sheet of for example soda lime silicate glass 260 which may have been chemically toughened, is cut into shape with the required edge profile. This second glass sheet may also be moulded into an equal or less curved shape of the desired windscreen glazing, using for example, a gravity or sag bending process. That is, the required shape of the second glass sheet is achieved by a shaping process which is different to the process used to shape the first glass sheet for the windscreen glazing.

In a gravity sag-bending process, a sheet or ply of correctly sized flat glass is placed atop a bending ring and heated to a temperature at which the glass becomes malleable and sags freely under gravity. Sagging continues until the malleability of the glass is reduced by lowering the temperature. In the method of the present invention which seeks to bend a thin ply of glass, the final required shape of the second glass sheet for use in a laminated glazing is not completely achieved at this stage by the gravity sag-bending process.

As with the first sheet of glass, the second glass sheet is moulded with a radius of curvature in one or more directions of between 300 mm and 8000 mm. The second sheet of glass is however thinner than the first sheet of glass. The second sheet of glass may be as much as 65% less than the thickness of the first sheet of glass. For example, the thickness of the first glass sheet may be in the range of: 1.4 mm to 2.5 mm; or in the range of 1.6 mm to 2.3 mm. The thickness of the first glass sheet may also be in the range 1.6 mm to 2.1 mm. The thickness of the second glass sheet however may be in the range of: 0.2 to 1.4 mm; or in the range of 0.5 mm to 1.0 mm.

An adhesive interlayer 240 is then disposed between the first and second pre-moulded glass sheets in readiness for lamination. The adhesive interlayer may have a thickness range of 0.3 mm to 1.8 mm thick, or the adhesive interlayer may have a thickness range of 0.5 mm to 1.0 mm. Typically, however, the adhesive interlayer material preferably has a thickness of 0.76 mm, 0.50 mm, 0.38 mm, 0.36 mm or combinations thereof. Suitable adhesive interlayers which may be used in the method of the present invention include but are not limited to for example: polyvinylchloride (PVC), polyvinylbutyral (PVB), Ethylene-vinyl acetate (EVA), also known as poly(ethylene-vinyl acetate) (PEVA), poly(ethylene terephthalate) (PET), ethyl methyl acrylate (EMA) and polyurethane. A preferred interlayer used in the method of the present invention is however polyvinyl butyral (PVB).

Next, a thin layer of foil 280 may be applied in between the outer surface (S4) 290 of the second glass sheet which is not in contact with the adhesive interlayer and a shaped mould 285.

The thin foil layer 280 is preferably a non-stick film, which is placed between the second glass sheet 260 and the mould 285 to prevent scratching. Suitable thin foils may include for example but are not limited to: polyester films available from Hostaphan Films or Mitsubishi Polyester Film GmbH under the brand names of Hostaphan® and Diafoil®.

The shaped mould 285 is preferably sized and shaped to match the profile of the first glass ply 220. The mould may be comprised of a suitable material such as for example a plastic, glass or ceramic material.

More preferably however, the mould is a glass sheet prepared by the same batch process used to prepare the first glass sheet 220 and thereby formed to be substantially the same shape as the first glass sheet. This mould is referred to herein a slave mould or slave glass.

Prior to lamination of the first pre-moulded glass sheet 220, and the second pre-moulded glass sheet 260 in accordance with the present invention, the first pre-moulded glass sheet 220, the second pre-moulded glass sheet 260 and the slave mould or glass 285, are preferably offset relative to each other, more specifically, offset vertically. This is explained further with reference to FIGS. 2, 3*a* and 3*b*.

Figure 3A:
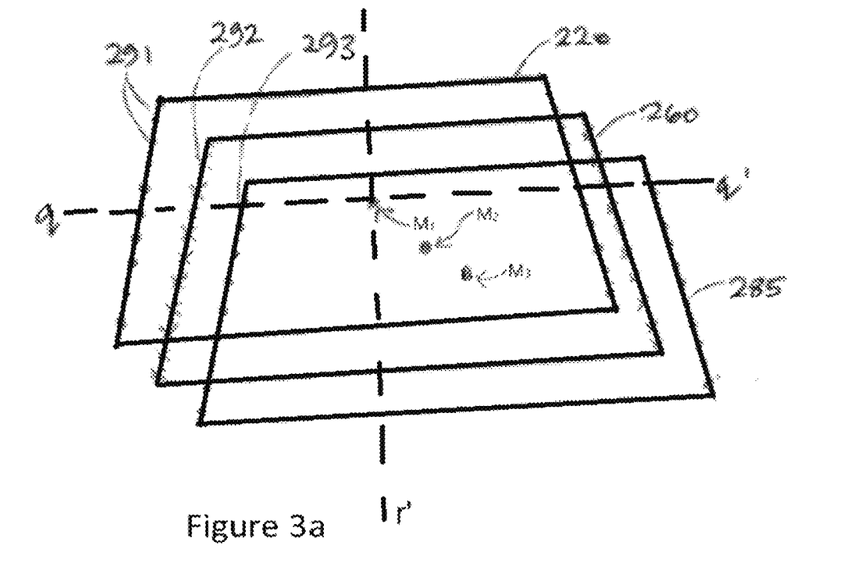
FIG. 3*a* is a schematic representation of a first glass sheet, a second glass sheet and slave mould prior to laminations indicating location marks.
Figure 3B:
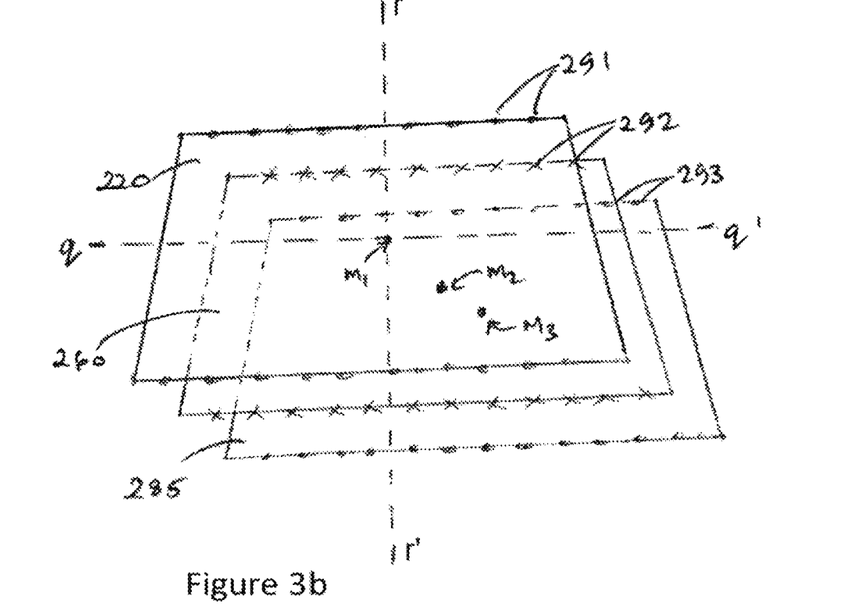
FIG. 3*b* is a schematic representation of a first glass sheet, a second glass sheet and slave mould prior to laminations indicating the location of preferred location marks.

As can be seen in FIG. 3*b*, the first pre-moulded glass sheet 220 and the second pre-moulded glass sheet 260 and the slave mould or glass 285, are preferably offset (vertically) relative to each other to improve optical quality in transmission. For clarity, the interlayer and foil layer have been omitted in FIGS. 3*a* and 3*b*. As also seen in FIGS. 3*a* and 3*b*, each of the first pre-moulded glass sheet 220 and the second pre-moulded glass sheet 260 and the slave mould or glass 285 each comprise a series of locator marks 291, 292 and 293 respectively, each series of locator marks preferably extend along at least the edge of each side of the first pre-moulded glass sheet 220 and the slave mould 285, and also preferably may extend along each side of the second glass sheet.

These locator marks serve as a guide for alignment of each of the glass sheets and the slave mould or glass prior to lamination. Preferably the marks are applied along the bottom and/or top edge of the glass sheets and slave mould or glass, with respect to installation of the laminated in for example a vehicle. Consequently, prior to lamination of the first and second glass sheets, the extent of offset between the first and second glass sheet may be calculated and implemented so to achieve maximum benefit and minimal distortion when the so produced laminated glazing is installed in a vehicle, by alignment of the locator marks on the first and/or second glass sheet and the slave mould. It will be appreciated by one skilled in the art that the locator marks preferably applied to the sheets of glass and the slave mould or glass are preferably applied just as a way of aligning the sheets of glass and the slave mould or glass. Various means may be employed to the align the sheets of glass and the slave mould or glass such as for example but not limited to: printed marks, adhesive labels, etching of the glass sheets and slave mould and/or combinations thereof.

As illustrated in FIGS. 2(*a*), 2 (*b*), 2 (*c*), 2 (*d*), 3*a* and 3*b*, prior to 'pre-nip' and prior to lamination, the first pre-moulded glass sheet 220 is first positioned and then the adhesive interlayer 240 is placed on face 220*b* of the first pre-moulded glass sheet 220, followed by the second pre-moulded glass sheet 260 being placed on the adhesive interlayer 240, but not offset relative to the first pre-moulded glass sheet 220. The thin foil layer 280 is then placed next to the second pre-moulded glass sheet 260 and the face 285*a* of the slave mould or glass sheet 285 finally applied against the free side of the thin foil layer 280. However, the slave mould or slave glass 285 and the foil 280 are offset with respect to the first pre-moulded glass sheet 220 and the second pre-moulded glass sheet 260.

Consequently, the face 220*a* of the first glass sheet 220 and the face 285*b* of the slave mould or glass 285 form the two outer faces of a 'pre-nip' structure, but with these two components of the structure offset. In the pre-nip process the components are held under vacuum and at a temperature in the region of 90 to 110° C.

As can be seen in FIGS. 3*a* and 3*b*, which shows the first pre-moulded glass sheet 220, the second pre-moulded glass sheet 260 (separated by the adhesive interlayer 240 not shown), and the slave mould or glass 285 separated from the second pre-moulded glass sheet 260 (by thin foil layer 280 not show), the amount of offset in relation to axis r-r' (vertical) and/or q-q' (horizontal) will depend on the required final product. However, it has been found by the inventors that a vertical offset of the first pre-moulded glass sheet 220, the second pre-moulded glass sheet 260 (separated by the adhesive interlayer 240 not shown), and the slave mould or glass 285 is preferred as this produces improved optical quality results in transmission. In addition, the inventors have found that the tolerances associated with for example the locator marks, (preferably arranged along the top and bottom edges of the first pre-moulded glass sheet 220, the second pre-moulded glass sheet 260 and the slave mould or glass 285) should preferably be no more than half of the calculated and desired offset value to ensure a consistently improved optical quality in transmission.

The reference points or series of locator marks 291, 292, 293 on each of the first pre-moulded glass sheet 220 and the second pre-moulded glass sheet 260 and the slave mould or glass 285 are marked on a major surface thereof. Substantially centrally located imaginary reference points M1, M2 and M3, denoting the centre point of each of the first pre-moulded glass sheet 220, the second pre-moulded glass sheet 260 and the slave mould or glass 285 respectively may also be marked.

Figure 2B:
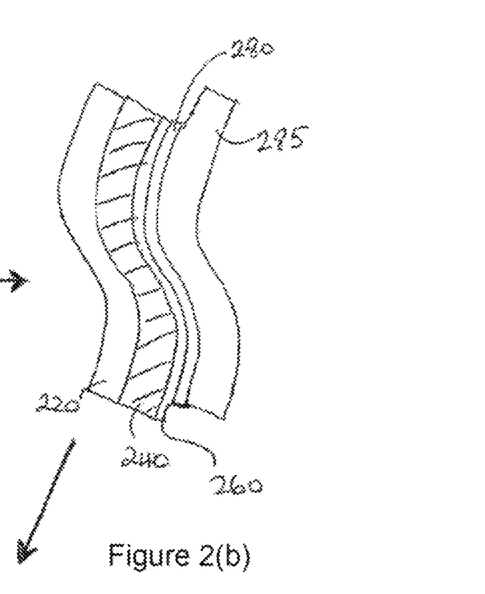
Figure 2C:
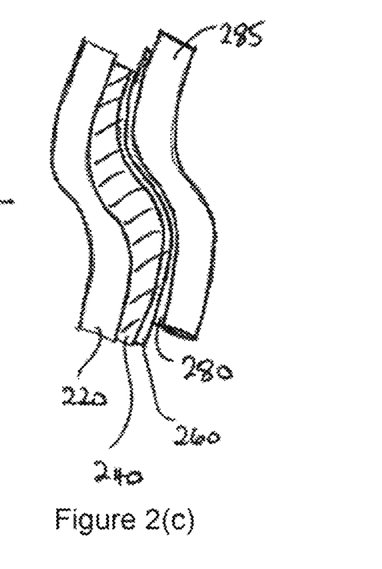

In a conventional lamination process, when the inner and outer plies of a laminated glazing are positioned for lamination, the imaginary reference points, M1 and M2 for the first and second glass sheets may be aligned. In this way, the edges of the resulting laminated glazings are also aligned. However, in accordance with the present invention, the reference points M1, M2, M3 along with locator marks 291, 292, 293 are preferably deliberately offset vertically. Consequently, the first pre-moulded glass sheet 220, the second pre-moulded glass sheet 260 and the slave mould or glass 285 are offset relative to one another when viewed at normal incidence to the surface of the laminated glazing (as in FIG. 2(*b*)).

The air trapped between the glass sheets 220, 260 and adhesive interlayer 240 is removed using for example a vacuum extraction technique or a nip roller process in order to expel air from between the glass sheets and adhesive interlayer with the slave glass also in place.

Lamination of the glass sheets and adhesive interlayer is then completed using for example an autoclave, which joins the first and second glass sheets 220, 260 and adhesive interlayer together into the required shape of the desired laminated glazing, with the shape of the second glass sheet being determined by the slave glass as illustrated in FIG. 2(*c*). In order to achieve the laminated product according to the present invention, in the autoclave, a typical pressure range for the lamination process is typically in the range 8 bar to 16, for a period of 30 to 120 minutes.

Also, to achieve the offset laminated glazing according to the present invention it is preferable to enlarge the vacuum rings (or lips), in order to hold in place, the first and second glass sheets 220, 260 and adhesive interlayer along with the foil layer and slave glass and to ensure the application of a robust and effective vacuum even if the first and second glass sheets 220, 260, adhesive interlayer, foil layer and slave glass 285 are offset by several millimetres.

The temperature range used for the lamination in accordance with the method of the present invention is typically in the range 90° C. to 132° C., or even 100° C. to 110° C., for a period of 30 to 120 minutes. In a preferred embodiment of the method according to the present invention, the temperature for the lamination process may preferably be in the region of 100 to 110° C., and the pressure may be in the region of 8 to 16 Bar for a period of 30 to 120 minutes. More preferably, the pressure range for the lamination process is in the range 10 bar to 13, for a period of 30 to 60 minutes.

The choice of suitable temperature and pressure parameters enables the interlayer such as polyvinylbutyral (PVB) to form a suitable adhesive bond between the glass sheets. That is, the temperature and pressure parameters are preferably selected in such a way that flow within the laminate structure is minimal, thus forcing the thinner sheet or ply of glass to follow the shape of the thicker sheet or ply of glass and also the shape of the slave glass. In addition, it is preferred that if a vacuum ring or vacuum bag is employed in the 'pre-nip' process to hold the glass sheets and slave glass in place, then this may be used also during the autoclave process.

Whilst an autoclave is preferably employed in the lamination process according to the present invention, it will be appreciated by one skilled in the art that were appropriate, it is also possible to utilize an oven equipped with vacuum ports in place of the autoclave to draw a vacuum from the vacuum ring or vacuum bag using suitable parameters as outlined above for the autoclave process.

The resultant laminated glazing prepared may be curved in one or more directions. The radius of curvature in each of the one or more directions may be between 300 mm and 8000 mm. When the laminated glazing is curved in two directions, each direction of curvature is suitably orthogonal to the other.

Figure 2D:
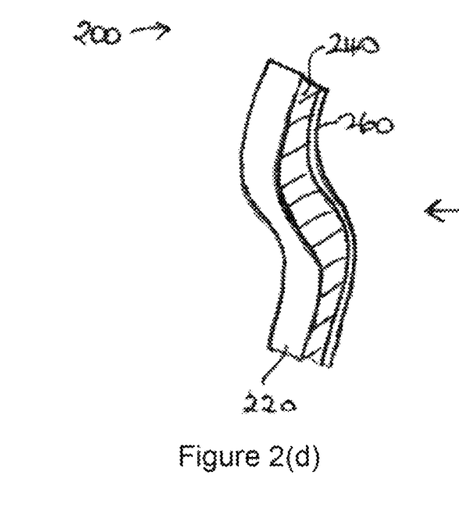

Once the lamination process is complete, the laminated glazing structure such as a windscreen may be removed from the autoclave. The slave mould or glass 285 and the thin film 280 may then be removed from the laminated first and second glass sheets to obtain a laminated glazing 400 which once washed, is ready for use as illustrated in FIG. 2(*d*).

As can be seen in FIGS. 3*a* and 3*b*, as the slave glass is offset by a certain amount relative to the position of the first and second glass sheets, the slave glass moulds the second glass sheet 260 into a shape which whilst following the shape of the slave glass and hence the first glass sheet, is offset with respect to the first glass sheet. As a result, a laminated glazing and hence for example a windscreen will be produced which is optimised for viewing by drivers and passengers when the glazing is installed in a vehicle.

Use of the thin foil layer 280 allows easy separation of the inner glass layer 260 from the slave glass mould 285, and also protects the surface 290 of the inner glass layer and the inner surface 284 of the slave glass mould 286 from scratches. Once the slave glass mould has been separated from the laminated glass plies, it is possible to re-use the slave glass mould in a second iteration of the method of the present invention. The slave glass or mould may be used as a slave mould again or alternatively, the slave glass mould may be used as the first glass sheet 220. In this way, the method of the present invention offers advantages such as: it avoids the generation of excess waste glass as the slave glass mould may be reused; and in addition, the laminated glazing prepared by the method has improved optical properties.

The inventors have found that by using the method of the present invention described above it is possible to achieve a laminated glazing in which the curvature of the inner surface 290 (S4) of the second sheet 260 and the curvature of the outer surface 295 of the first sheet 220 are substantially or almost identical albeit offset That is, by using the method of the present invention, the inventors have found that it is possible to adapt the second thinner glass sheet (or inner glass) to adopt the shape of the first thicker glass sheet (or outer glass).

The inventors have also found that a preferred slave glass or mould 285 for use in the method of the present invention is another shaped first glass sheet which follows the same profile as the first glass sheet, and which may be formed in for example the same press-bending batch process as the first glass sheet.

In one embodiment of the invention the offset arrangement of the components for the laminated glazing, may result in the edges of the first and second glass sheets 220, 260 respectively in the final laminated product not being aligned, as shown in FIG. 1*a*, such that the slave mould or glass 285 and hence the second pre-moulded glass sheet 260 produce an overlap region 295 with respect to the first pre-moulded glass sheet 220. The second pre-moulded glass sheet 260 consequently extending beyond the periphery of the first pre-moulded glass sheet 220 at one end of the laminated glazing as indicated by 295 and at the opposing end of the laminated glazing the second pre-moulded glass sheet 260 is positioned inboard 300 the periphery of the first pre-moulded glass sheet 220.

As a result, if required, the overlap region 295, 296 may be removed prior to laminating the first and second glass sheets 220 and 260 respectively by for example cutting. Alternatively, the glass sheets 220 and 260 may be cut prior to shaping such that when deliberately offset in the pre-nip process, the edges are aligned in the resulting laminated glazing. It will be apparent that the glass sheets may be cut to have an outline defined by the required degree of overlap between the outer 220 and inner 260 glass sheets respectively. Alternatively, the resultant laminated glazing may be encapsulated such that the peripheral edge of the laminate is covered with a gasket of suitable material such as polyurethane and thereby hides the misaligned edges.

However, it is most preferred in relation to the present invention as illustrated in FIG. 1*b*, that the slave mould or glass 285 is offset vertically relative to the first and second sheets 220, 260, such that after lamination the first and second glass sheets are well aligned, ensuring the improved optical properties which the laminated glazing is installed in a vehicle. The alignment of the first and second glass sheets 220, 260, thereby removes the need for extra cutting of the glass sheets or encapsulation of the edges of the laminated glazing.

The laminated glazing prepared in the embodiments of the present invention described above, preferably comprise sheets of soda-lime silicate glass having a composition such as clear float glass. The glass sheets may for example also comprise iron oxide as a tinting agent to provide the laminated glazing with a measure of solar control.

A typical soda-lime silicate glass composition may comprise by weight for example: $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2%; and $Fe_2O_3$ 0.005-2%. Alternatively, the soda-lime silicate glass composition may comprise by weight for example: $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2%.

The glass sheets may also contain other additives, for example refining aids, which would normally be present in an amount up to 2%. The soda-lime silicate glass composition may also contain other colouring agents such as $CO_3O_4$, NiO and Se to impart to the glass composition a desired colour when viewed in transmitted light.

Also, the soda-lime silicate glass composition for each of the glass sheets used in the methods of the present invention may be the same or different.

In addition, one or more of the glass sheets used in the methods of the present invention may be chemically toughened. Chemical toughening or strengthening involves treating glass sheets with for example a potassium salt solution such as potassium nitrate in which the glass sheets are submersed at a temperature in the range 300° C. to 460° C.; more preferably at a temperature in the range 400° C. to 460° C.; most preferably at a temperature in the range 420 to 460° C., such as around 450° C. Immersion of the glass in the potassium salt causes sodium ions in the glass surface to be replaced by potassium ions from the solution to impart additional impact resistance to the glass sheets when laminated. It is particularly preferred that the second thinner glass sheet 290 (or inner glass) is chemically toughened.

For example, the chemically toughened glass sheets may preferably comprise an alkali aluminosilicate glass composition, which may comprise in the region of 6 weight % aluminium oxide.

Suitable compositions for the chemically toughened glass sheets may preferably comprise for example: 66-72 mol. % $SiO_2$, 1-4 mol. % $Al_2O_3$, 8-15 mol. % MgO, 1-8 mol. % CaO, 12-16 mol. % $Na_2O$, preferably wherein the amount of MgO and CaO is between 12 and 17 mol. % and CaO/(MgO+CaO) is in the range 0.1 and 0.4, available from NSG as glanova™. Alternatively, the chemically toughened glass sheets may preferably comprise (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Also, in accordance with the method of the present invention, the outer surface S1 may preferably have a surface residual compression stress ranging from 10 MPa to 20 MPa, in for example a 300 mm band extending around the periphery of the windscreen. That is, the surface compression stress for the convex surface S1 of for example the first glass sheet 120, 220 of the laminated glazing may have an edge region having a residual edge stress with a net tension below 11 MPa and an edge compression above 25 MPa.

In relation to the present invention it has been found that lamination of two glass sheets and an interlayer for forming a light-weight windscreen may be achieved in such a way that the optical power in transmission (or the visible distortions) recorded for such a laminated glazing are significantly reduced compared with the same values recorded for a laminated glazing prepared using standard autoclave conditions.

Preferably, the recorded optical power of a laminated windscreen prepared using the method of the present invention does not exceed by 50% the value recorded for a standard windscreen with glass plies of thickness 2.1 mm.

The recorded optical power values for the light weight laminated glazing prepared by the method of the present invention are also significantly improved compared with the recorded optical power values obtained for a lightweight laminated glazing prepared by conventional means, and which typically exceed by 80% to 110% the optical power values recorded for a standard windscreen (comprising for example, two glass sheets each of around 2 mm each).

Flowchart of Method.

Figure 5:
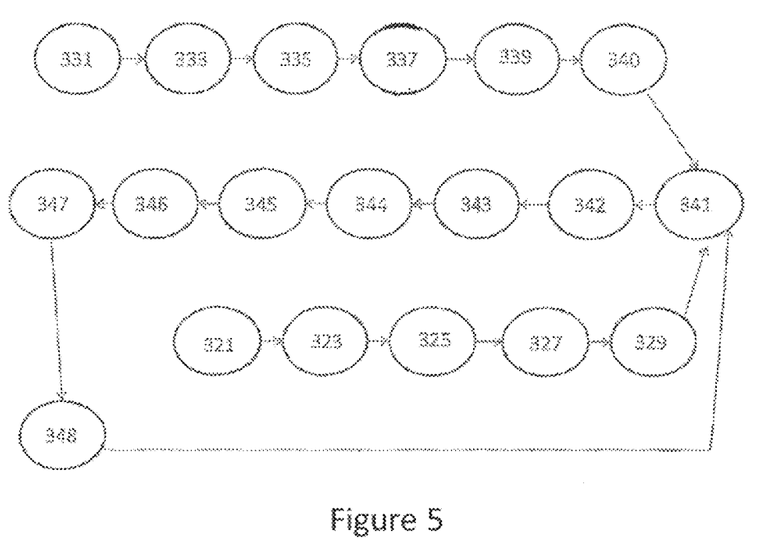
FIG. 5 is a summary flowchart diagram for method of preparing a laminated windscreen glazing in accordance with the present invention.

In FIG. 5 there is provided a proposed summary flowchart diagram suitable for the method of preparing a laminated glazing such as a windscreen in accordance with the present invention.

Initially a first sheet of for example soda-lime silicate glass may be provided at step 321. The soda-lime-silicate glass may be clear or tinted. By clear float glass, is meant a glass sheet having a composition as defined in BS EN 572-1 and BS EN 572-2 (2004) incorporated herein by reference.

At step 323 the first glass sheet may be cut and shaped generally to the desired shape using conventional techniques such as for example press-bending. The glass sheet of clear float glass may have a thickness for example in the range of 1.4 to 2.5 mm. At step 325 the edges of the glass sheet (also known as an outer blank) may be smoothed or 'edge-worked', following which the glass sheet may be washed.

After washing, one or both major surfaces of the glass sheet may be printed as required for the final product. For example, if the final product is a vehicle windscreen, a layer of ink, which may be optically opaque and/or electrically conductive, may be printed around the periphery of the glass sheet to form an obscuration band, as is conventional in the art.

In step 327 the glass sheet may be heated to glass softening temperature in a suitable furnace. The heat-softened glass may then be press-bent between a pair of complementary shaping members to impart a desired curvature to the outer sheet. Press bending allows precise control of the shape of the glass sheet. Examples of press-bending stations and operations are described in WO2005/033026A1 and EP0677486A2. Once bent, the cut sheet of for example clear float glass may proceed as the first sheet of the laminated glazing, such as a windscreen.

To control the stresses in the first glass sheet, the upper and/or lower press bending shaping members may be heated to control the residual edge stress and/or the edge compression of the outer sheet. By selecting the required temperature of the upper and/or lower press bending shaping members it is possible to produce an outer sheet having an edge region having a residual edge stress with for example a net tension below 11 MPa and an edge compression above 25 MPa.

The residual surface stress may also be controlled by directing cooling air around the periphery of the bent glass sheet shortly after completion of the press-bending operation and before cooling the bent sheet to room temperature.

After possible cooling air has been directed onto the edges of the glass sheet for a suitable length of time to produce the required residual stress in the cooled bent glass sheet, the bent glass sheet is preferably controllably cooled at step 329 to room temperature in a suitable annealing furnace.

Bending a series of glass sheets may form part of a batch process, in which a number of the first glass sheets are bent one after another. In this way, one of the glass sheets from the batch may be used as the first glass sheet in a laminated glazing and another of the glass sheets from the same batch may be used as a slave glass mould during the autoclave procedure as described below.

The first glass sheet may be bent in one or more directions. The curvature in the one or more directions may have a radius of curvature between 300 mm and 8000 mm.

The second glass sheet of the laminated glazing may be produced as follows.

At step 331 a second sheet of glass is provided. The second sheet of glass may be for example soda-lime silicate glass as described above, or chemically strengthened glass as described above. The soda lime silicate glass or the chemically strengthened glass may be clear, tinted, or modified as required. In this example a sheet of clear float glass may be provided at step 331, which may be preferably soda-lime silicate glass or chemically strengthened glass.

The second sheet of soda-lime silicate glass or chemically strengthened glass may preferably have a thickness in the region of for example 0.7 mm or less and is cut at step 333 to have the same periphery as the unbent first glass sheet (or outer blank). Before being bent, the cut second sheet of soda-lime silicate glass or chemically strengthened glass may be referred to also as the inner blank. The second sheet of soda-lime silicate glass or chemically strengthened glass may for example have a thickness of between 0.2 mm and 1.4 mm. Alternatively, the second sheet of soda-lime silicate glass or chemically strengthened glass may for example have a thickness of between 0.5 mm and 1 mm.

At step 335, the second glass sheet is preferably suitably edge worked and washed prior to being bent.

At step 337 the second glass sheet is preferably placed on a suitable ring mould to support the second glass sheet close to the periphery thereof. The second glass sheet is then heated to a sufficient temperature to cause the soda-lime silicate glass to soften and sag under the influence of gravity. This procedure is conventionally referred to as gravity or sag bending. The glass sags or bends preferably to a shape close to that of the bent first glass sheet. However, at this point, the curvature of the second glass sheet may not be the same as the first glass sheet.

At step 339 the bent second glass sheet may be annealed using controlled cooling to reduce the temperature to room temperature.

At step 340, if chemically strengthened glass has not been used, the bent second glass sheet which may for example be soda-lime silicate glass, may be modified further, for example the glass sheet may be subject to an ion exchange process, wherein typically, sodium ions in the second glass sheet are chemically exchanged for potassium ions.

It is also envisaged that the bent second glass sheet of soda-lime silicate glass or chemically strengthened glass may be thermally toughened, even though it may be difficult to thermally toughen sheets of glass that have a thickness of 1 mm or less.

At step 341 a bent first glass sheet (following steps 321-329) and a bent second glass sheet (following steps 331-340) are provided.

The pair of bent first and second glass sheets are washed at step 342, and at step 343 a sheet of interlayer material such as for example, polyvinyl butyral, having a thickness of between 0.3 mm and 1.5 mm may be positioned between the first glass sheet and the second glass sheet.

In this particular example, the interlayer material may preferably be a 0.76 mm thick sheet of polyvinyl butyral (PVB), although other suitable adhesive interlayer material may be used.

At step 345, in addition to the positioning of a suitable interlayer between the bent first and second glass sheets, a thin foil layer may also be placed on the opposite side of the bent second glass layer to the interlayer. In addition, a mould, which may be in the form of another bent first glass sheet (or outer blank) may be placed on the opposing side of the thin foil layer to the bent second glass sheet.

At step 346 the assembly of first glass sheet, and the second glass sheet with the PVB sheet there between, with (or without) the additional foil layer there and with the slave mould (such as an additional bent first glass sheet) are then offset to the required amount and pre-nipped to remove air from between the glass sheets. The components from the pre-nip are then autoclaved using suitable conditions as defined above in relation to the method of the present invention, to join the first glass sheet to the second glass sheet via the PVB sheet.

In step 347 the foil layer and slave mould are then removed, and at step 348 if the slave mould is in the form of another first glass sheet, this may be washed and recycled back into step 341, either as a bent first glass sheet for lamination or as a slave mould again.

The laminated glazing so produced at step 348 may then be washed and inspected ready for shipping to a customer. In this way, a laminated glazing according to the present invention is produced.

Results.

To illustrate the offset effect when aligning the first pre-moulded glass sheet 220, the second pre-moulded glass sheet 260 and the slave mould or glass 285 during lamination, a series of laminated glazings such as a windscreen for a vehicle windscreen were prepared according to the present invention described above both with and without an offset alignment during lamination.

The laminated glazing comprised a first pre-moulded glass sheet 220 of 1.8 mm float glass joined to a second pre-moulded glass sheet 260 of 0.7 mm chemically toughened float glass via an adhesive sheet of PVB.

The first pre-moulded glass sheet 220 and the slave mould or glass 285 used in the lamination were both made by press bending under substantially the same bending conditions. A suitable press bending furnace method is described in WO2004/085324A1, in particular the figures and related description thereof incorporated herein by reference. Other suitable press bending furnaces are known, for example as described in EP0398759A2.

Figure 4:
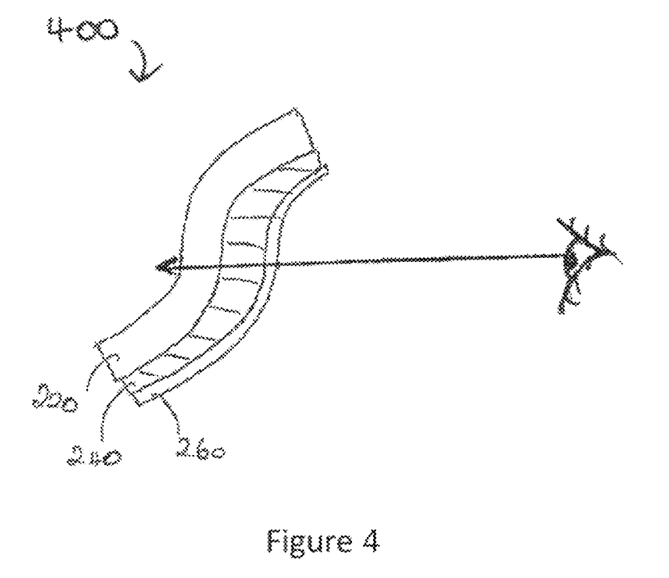
FIG. 4 is a schematic representation of a laminated glazing prepared according to the present invention when installed in a vehicle.

The laminated glazing was made with a slave mould or glass 285 vertically aligned with a 2.5 mm offset with respect to the first pre-moulded glass sheet 220. In this context, "vertical" means the direction with respect to the windscreen in the installed position. FIG. 4 illustrates a laminated glazing 400 in which the slave glass is offset during lamination as inclined for installation in a vehicle.

Each windscreen sample was tilted from a vertical position to simulate an installation angle.

In order to assess the optical effects, the optical power was measured in vision zones as described in ECE R43. The optical power in transmission was measured using a technique as described in WO2004/083835A1 incorporated herein by reference and also in WO2016/030678 incorporated herein by reference. A parameter ROC was used to define each windscreen under test. The parameter ROC is the difference between the maximum optical power and minimum optical power within a certain distance and is used to describe the observable distortions in the glass.

The measured optical power characterised in terms of the parameter ROC was divided by the average optical power to give a value for the 'normalised optical power'.

This test was carried out on the laminated glass. Five laminated glazings in the form of windscreens were prepared according to the method of the present invention offset with the same degree of alignment of 2.5 mm for slave mould compared to the inner and outer plies prior to lamination. The temperature of the pre-nip procedure was in the region of 90° C. to 110° C. and the autoclave temperature for the lamination was set to 90° C. to 132° C.

The results obtained for the five windscreens prepared with a 2.5 mm offset are provided in Table 1 and the results for four windscreens prepared without offset according to the method of the present invention, and with pre-nip and autoclave temperatures within the range of the present invention are provided in Table 2.

TABLE 1

Trial 1—Windscreen prepared with 2.5 mm offset.

| Sample Zone A | Min. total power | Max. total power | Min. vertical power | Max. Vertical power | ROC | Min. horizontal power | Max. horizontal power | ROC |
|---|---|---|---|---|---|---|---|---|
| 1 | −79.7 | 64.8 | −45.7 | 38.4 | 85.8 | −29.5 | 20.1 | 47.4 |
| 2 | −47.1 | 48.4 | −27.6 | 29.2 | 52.7 | −19.6 | 17.5 | 36.8 |
| 3 | −55.8 | 64.3 | −35.6 | 44.0 | 81.1 | −25.9 | 19.3 | 45.2 |
| 4 | −52.4 | 44.0 | −31.9 | 27.2 | 58.7 | −21.4 | 17.1 | 36.4 |
| 5 | −63.5 | 56.1 | −37.1 | 34.8 | 68.4 | −23.7 | 21.8 | 42.1 |
| Average results | −59.7 | 55.5 | −35.6 | 34.7 | 69.3 | −24.0 | 19.2 | 41.6 |

| Sample Zone B | Min. total power | Max. total power | Min. vertical power | Max. Vertical power | ROC | Min. horizontal power | Max. horizontal power | ROC |
|---|---|---|---|---|---|---|---|---|
| 1 | −68.7 | 60.7 | −47.5 | 45.7 | 132.0 | −25.7 | 24.7 | 43.6 |
| 2 | −78.7 | 49.7 | −52.8 | 31.8 | 81.4 | −28.8 | 21.4 | 43.8 |
| 3 | −92.3 | 63.7 | −60.8 | 44.9 | 105.6 | −22.4 | 22.4 | 43.9 |
| 4 | −61.6 | 50.5 | −38.8 | 38.1 | 93.1 | −20.3 | 18.7 | 37.0 |
| 5 | −83.6 | 54.6 | −47.4 | 35.5 | 96.4 | −23.6 | 21.1 | 40.8 |
| Average results | −77.0 | 55.8 | −49.5 | 39.2 | 101.7 | −24.2 | 21.7 | 41.8 |

TABLE 2

Trial 2—Windscreen prepared with zero offset.

| Sample Zone A | Min. total power | Max. total power | Min. vertical power | Max. Vertical power | ROC | Min. horizontal power | Max. horizontal power | ROC |
|---|---|---|---|---|---|---|---|---|
| 1 | −61.1 | 59.2 | −38.9 | 40.8 | 73.0 | −21.1 | 19.0 | 39.8 |
| 2 | −56.5 | 52.9 | −39.9 | 38.0 | 73.1 | −25.1 | 23.8 | 49.2 |
| 3 | — | — | — | — | — | — | — | — |
| 4 | −64.1 | 61.0 | −40.7 | 35.4 | 71.0 | −26.1 | 23.0 | 49.2 |
| 5 | −57.0 | 59.5 | −39.8 | 39.2 | 79.1 | −25.9 | 24.1 | 52.5 |
| Average results | −59.7 | 58.2 | −39.8 | 38.4 | 74.1 | −24.6 | 22.5 | 47.7 |

| Sample Zone B | Min. total power | Max. total power | Min. vertical power | Max. Vertical power | ROC | Min. horizontal power | Max. horizontal power | ROC |
|---|---|---|---|---|---|---|---|---|
| 1 | −86.2 | 67.3 | −64.1 | 67.2 | 131.9 | −22.6 | 19.7 | 41.5 |
| 2 | −85.2 | 80.1 | −62.5 | 51.8 | 106.8 | −24.9 | 34.2 | 57.5 |
| 3 | — | — | — | — | — | — | — | — |
| 4 | −79.5 | 95.0 | −58.4 | 63.2 | 118.9 | −21.8 | 51.3 | 66.3 |
| 5 | −77.1 | 69.4 | −58.0 | 53.4 | 103.9 | −28.4 | 42.3 | 62.7 |
| Average results | −82.0 | 78.0 | −60.8 | 58.9 | 115.4 | −24.4 | 36.9 | 57.0 |

The results in Tables 1 and 2 were analysed and the 'average results' compared for the two sets of samples. The average of the relative percentage values was then calculated. This average difference between the two sets of values for the offset and non-offset laminated glazing was found to be 14.3%, indicating a positive improvement in performance for the offset process according to the present invention.

TABLE 3

Summary of Results

| Trial Number | Pre-Nip Temp. ° C. | Autoclave Temp. ° C. | Vacuum During Autoclave | Slave Glass | Comment |
|---|---|---|---|---|---|
| 1 | 95 | 105 | Yes | Yes | Optimum slave route |
| 2 | 95 | 105 | Yes | Yes—with slave glass offset 2.5 mm higher than outer and inner glass sheets | Positive effect of offset slave glass on optics for a laminated glazing |

The results above demonstrate that the ROC values vary as a function of offset alignment of the slave glass (sheet 285) compared with the first and second pre-moulded glass sheets (220, 260).

The results further demonstrate that when using an offset lamination process using a slave glass or mould according to the present invention, a laminated glazing is produced having a better optical quality in terms of ROC when measured at an installation angle (that is around 60° from the vertical) compared to when measured at normal incidence (that is, at 0° from vertical).

The present invention provides particular application for the production of windows for cars especially vehicle windscreens. Such windows typically comply with the requirements of ECE R43.

Therefore, in summary, it can be seen that in accordance with the method of the present invention it is possible to produce not only light weight windscreens but light weight windscreens with improved visual appearance and optical parameters.

The invention claimed is:

1. A process for preparing a laminated glazing suitable for use in a vehicle comprising:
   i) providing a first glass sheet formed into a desired shape with a first thickness by a first procedure;
   ii) providing a second glass sheet formed into a desired shape with a second thickness by a second procedure;
   iii) providing an interlayer located between the first and second glass sheet;
   iv) providing a mould which is shaped substantially the same as the first glass sheet and applying the mould against the second glass sheet;
   v) aligning the first and second glass sheets;
   vi) misaligning the mould with respect to the second and first glass sheets such that the mould is offset relative to the first and second glass sheets; and
   vii) laminating together the first and second glass sheets and the interlayer at a temperature and pressure sufficient to adhere the interlayer material to the glass sheets, such that after lamination, the second glass sheet is offset with respect to the first glass sheet while the shape of the second glass sheet is substantially the same as the shape of the first glass sheet, to thereby compensate for distortions in the laminated glazing when the laminated glazing is installed in the vehicle.

2. A process according to claim 1 wherein the mould is aligned with a vertical offset with respect to the first and second glass sheets.

3. A process according to claim 1 wherein the mould, second glass sheet and first glass sheet are offset by positioning means which hold the mould in a required offset position relative to the second glass sheet and first glass sheet prior to and during lamination of the glass sheets.

4. A process according to claim 3 wherein the positioning means comprises a profiled vacuum ring or wherein the positioning means comprises one or more clamps and/or stoppers.

5. A process according to claim 1 wherein,
   i) the first glass sheet comprises at least one first positioning means; and/or
   ii) the second glass sheet comprises at least one second positioning means; and/or
   iii) the mould comprises at least one third positioning means, and wherein
   iv) the first and second glass sheets and the mould are aligned by the at least one first positioning means and/or the at least one second positioning means and/or the at least one third positioning means respectively prior to and during lamination.

6. A process according to claim 1 wherein in vii) the first and second glass sheets and the interlayer are laminated together at a temperature in a range of 90° C. to 132° C., and a pressure in a range 8 to 16 bar, to adhere the interlayer material to the first and second glass sheets.

7. A process according to claim 1, wherein the second thickness of the second flat glass sheet is in a range 0.2 mm to 1.4 mm; and/or wherein the first thickness of the first glass sheet is in a range 1.4 mm to 2.5 mm.

8. A process according to claim 1 wherein in step vii) the lamination occurs at a temperature in a range of 100° C. to 110° C. and/or the lamination occurs in an autoclave.

9. A process according to claim 1, wherein the interlayer comprises polyvinylbutyral (PVB).

10. A process according to claim 1, wherein the first procedure to form the first glass sheet into the desired shape comprises press-bending; and/or wherein the second procedure to form the second glass sheet into the desired shape comprises gravity sag-bending.

11. A process according to claim 1 wherein the first thickness of the first glass sheet is different from the second thickness of the second glass sheet.

12. A process according to claim 1 further comprising:
   vii) providing a foil layer between the second glass sheet and the mould shaped substantially the same as the first glass sheet, prior to laminating.

13. A process according to claim 12 wherein the mould shaped substantially the same as the first glass sheet is comprised of glass, ceramic or metal; and/or wherein the mould shaped substantially the same as the first glass sheet comprises a third glass sheet.

14. A process according to claim 13 wherein the third glass sheet comprises a press bent glass sheet; and/or wherein the thickness of the third glass sheet is in a range 1.4 mm to 2.5 mm.

15. A process according to claim 14 further comprising:
   ix) removing the third glass sheet and the foil layer from the laminated first and second glass sheets.

16. A process according to claim 12 wherein the foil layer comprises a thickness in a range of 0.05 mm and 0.2 mm, and/or comprises a non-stick film, and/or comprises a non-stick polyester film.

17. A process according to claim 1 wherein the first and third glass sheets are prepared in a single press-bending batch process.

* * * * *